(12) United States Patent
Sakauchi et al.

(10) Patent No.: US 12,237,681 B2
(45) Date of Patent: Feb. 25, 2025

(54) MICROGRID STARTUP METHOD AND STARTUP PROGRAM

(71) Applicants: KABUSHIKI KAISHA TOSHIBA, Tokyo (JP); TOSHIBA ENERGY SYSTEMS & SOLUTIONS CORPORATION, Kanagawa (JP)

(72) Inventors: Yoko Sakauchi, Tokyo (JP); Yukina Akiyama, Kanagawa (JP); Yuki Kudo, Tokyo (JP); Shunsuke Kawachi, Tokyo (JP); Koji Toba, Tokyo (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 18/263,110

(22) PCT Filed: Feb. 19, 2021

(86) PCT No.: PCT/JP2021/006427
§ 371 (c)(1),
(2) Date: Jul. 26, 2023

(87) PCT Pub. No.: WO2022/176167
PCT Pub. Date: Aug. 25, 2022

(65) Prior Publication Data
US 2024/0128754 A1    Apr. 18, 2024

(51) Int. Cl.
*H02J 3/24*    (2006.01)
*H02J 3/32*    (2006.01)
(Continued)

(52) U.S. Cl.
CPC ............ *H02J 3/241* (2020.01); *H02J 3/32* (2013.01); *H02J 3/46* (2013.01); *H02M 7/48* (2013.01); *H02J 2300/24* (2020.01)

(58) Field of Classification Search
CPC ...... H02J 3/241; H02J 3/32; H02J 3/46; H02J 2300/24; H02M 7/48
(Continued)

(56) References Cited

U.S. PATENT DOCUMENTS

| 2012/0175955 A1* | 7/2012 | Carralero | H02J 9/062 307/65 |
| 2019/0103743 A1 | 4/2019 | Sun et al. | |
| 2021/0021210 A1 | 1/2021 | Fujiwara et al. | |

FOREIGN PATENT DOCUMENTS

| JP | 2016-10252 A | 1/2016 |
| JP | 2017-70129 A | 4/2017 |

(Continued)

OTHER PUBLICATIONS

Japan Patent Office, International Search Report in International Application No. PCT/JP2021/006427, 2 pages (May 18, 2021).

*Primary Examiner* — Michael R. Fin
(74) *Attorney, Agent, or Firm* — Finnegan, Henderson, Farabow, Garrett & Dunner, LLP (57) ABSTRACT

A startup method and startup program for microgrid that enable to stably start up the microgrid without producing frequency fluctuation is provided. An embodiment of the present disclosure is a startup method for microgrid configured by a plurality of inverter power supplies independently sharing a load and divided into a master that starts up first and a slave that starts up secondly and later, the startup method comprising: a master initial startup step of initially starting up the master in a CVCF mode; a slave initial startup step of initially starting up the slave in a grid interconnection mode; and a control mode changing step of the master and the slave changing control modes thereof when output fluctuation of the master and the slave becomes a predetermined threshold or less or when the master and the slave or other inverter power supplies become a predetermined (Continued)

operation state while output voltage of said master and said slave becomes a predetermined threshold or less.

10 Claims, 10 Drawing Sheets

(51) Int. Cl.
 *H02J 3/46* (2006.01)
 *H02M 7/48* (2007.01)
(58) Field of Classification Search
 USPC .......................................................... 307/45
 See application file for complete search history.

(56) References Cited

FOREIGN PATENT DOCUMENTS

| JP | 2017-175877 A | 9/2017 |
| JP | 6433636 B1 | 12/2018 |
| JP | 2019-193334 A | 10/2019 |
| KR | 10-1673494 B1 | 11/2016 |

* cited by examiner

MICROGRID STARTUP METHOD AND STARTUP PROGRAM

CROSS-REFERENCE TO RELATED APPLICATION

This application is a U.S. National Stage under 35 U.S.C. § 371 and claims priority to International Application No. PCT/JP2021/006427, filed Feb. 19, 2021, and which is incorporated herein in its entirety.

FIELD OF INVENTION

Embodiments of the present disclosure relate to a method and program for starting up microgrid without fluctuation.

BACKGROUND

Generally, in independent microgrid, a plurality of load nodes and an inverter power supply is connected to distribution line to form a microgrid area. Instruction values are transmitted to each inverter power supply in the area from an external control system to control output of each inverter power supply. Furthermore, one area of the microgrid is connected to another system via a switch.

Even if failure occurs in other systems connected to the area, such microgrid can establish voltage only by using the inverter power supply that independently shares a load and can start supplying power. Therefore, in the area of the microgrid, the preset inverter power supply independently starts up without waiting for recovery of upper systems, enabling quick recovery from power outage. The inverter power supply that independently shares a load may be solar power generators and battery devices.

PRIOR ART DOCUMENT

Patent Document

Patent Document 1: JP6433636B1

SUMMARY OF INVENTION

Problems to be Solved by Invention

If rotating-type generators are not present in the independent-type microgrid, frequency and voltage may not be maintained even when grid-interconnection mode is adopted as the control mode for the inverter power supply. Furthermore, frequency fluctuation is not considered at the time of starting up the inverter power supply in the independent microgrid. Therefore, fluctuation may occur due to phases and voltage when starting up the microgrid. Representative control mode for the inverter power supply may be a CVCF mode (Constant Voltage Constant Frequency mode), a droop mode (load concentration suppression mode), or a VSG mode (Virtual Synchronous Generator mode), and it is urgent to take specific measures to avoid fluctuation with respect to grid frequency, grid voltage, and converters when starting up the microgrid by such control modes.

The CVCF mode (Constant Voltage Constant Frequency mode) is a mode in which the inverter power supply itself establishes and operates at constant voltage and constant frequency. The droop mode (load concentration suppression mode) includes a droop mode of the master and a droop mode of the slave. The droop mode of the master has a drooping characteristic in which the inverter power supply changes frequency with respect to a change in active power output of the inverter power supply and a drooping characteristic in which the inverter power supply changes frequency with respect to a change in reactive power output of the inverter power supply, while the droop mode of the slave has a dropping characteristic in which the inverter power supply changes its active power output with respect to a change in grid frequency and a dropping characteristic in which the inverter power supply changes its reactive power output with respect to a change in grid voltage. The droop mode is a combination of these master control mode and slave control mode. The VSG mode (Virtual Synchronous Generator mode) is a control method in which the inverter power changes the frequency with respect to a change in active power output of the inverter power supply based on simulated mechanical characteristics of synchronous generators.

Embodiments of the present disclosure is proposed to address the above problems, and the objective is to provide a startup method and start up program for microgrid that enable to stably start up the microgrid without producing frequency fluctuation.

Means to Solve the Problem

To achieve the above objective, an embodiment of the present disclosure is a startup method for microgrid configured by a plurality of inverter power supplies independently sharing a load and divided into a master that starts up first and a slave that starts up secondly and later, the startup method comprising:
  a master initial startup step of initially starting up the master in a CVCF mode;
  a slave initial startup step of initially starting up the slave in a grid interconnection mode; and
  a control mode changing step of the master and the slave changing control modes thereof when output fluctuation of the master and the slave becomes a predetermined threshold or less or when the master and the slave or other inverter power supplies become a predetermined operation state while output voltage of said master and said slave becomes a predetermined threshold or less.

Furthermore, an aspect of the embodiments includes a startup program that instruct a computer to execute each step.

EMBODIMENTS (1) First Embodiment

Hereinafter, a first embodiment of the present disclosure will be described. Although the first embodiment is a startup method for microgrid including a plurality of steps, the first embodiment may be regarded as a startup program that instruct a computer to execute each step. Furthermore, the first embodiment may also be regarded as a recording medium recording said startup program or a startup device for the microgrid including components to execute each step.
(Configuration of Microgrid)

Figure 1:
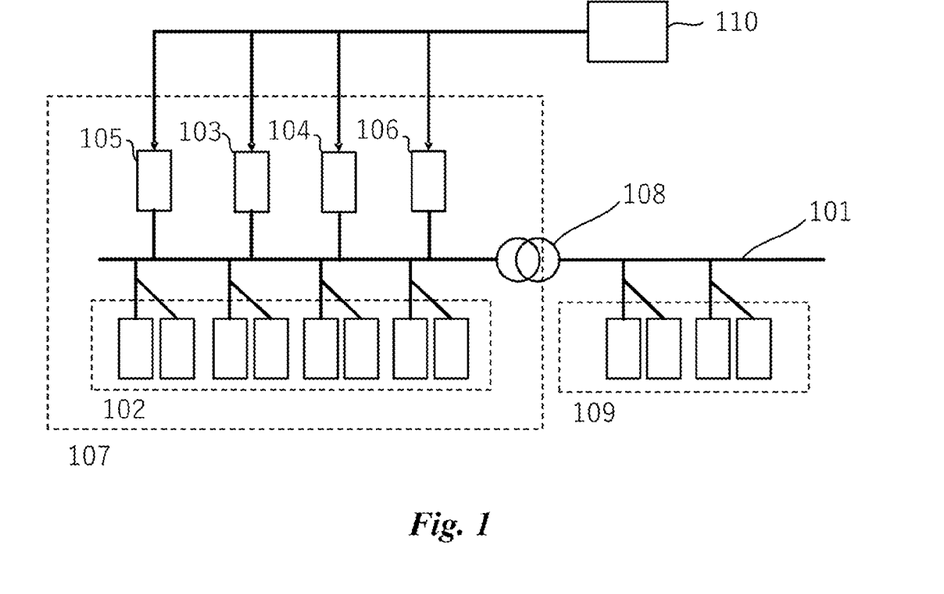
FIG. 1 is a block diagram illustrating a configuration of the first embodiment.

FIG. 1 is a block diagram illustrating grid configuration of independent microgrid connected to external grid. As illustrated in FIG. 1, a plurality of load nodes 102 is connected to a distribution line 101. Furthermore, two solar power generators 103 and 104 and two battery systems 105 and 106 are connected to the distribution line 101. These 103 to 106 are inverter power supplies with a load sharing function.

An area 107 including the load nodes 102, the solar power generators 103 and 104, and the battery systems 105 and 106 is the area 107 that becomes the microgrid. A switch 108 is provided in the area 107, and the region 107 is connected to another grid (upper grid) with interconnected loads 109 via the switch 108. Furthermore, command values are transmitted from an EMS (control system for entire grid) 110 that is an external control of the microgrid to the solar power generators 103 and 104 and the battery system 105 and 106. The solar power generators 103 and 104 and the battery systems 105 and 106 control the output based on the command value from the EMS 110.

In such independent microgrid, when failure occurs due to grid accident in the upper system to which the area 107 is interconnected, equipment connected to the area 107 with no accident can be started up. Therefore, the area 107 can be quickly recovered without waiting for recovery of upper systems. At this time, since a rotating-type generator is not present in the area 107, the area 107 must establish grid voltage and start supplying power only by the battery systems 105 and 106 which independently share a load.
(Startup Sequence)

Figure 2:
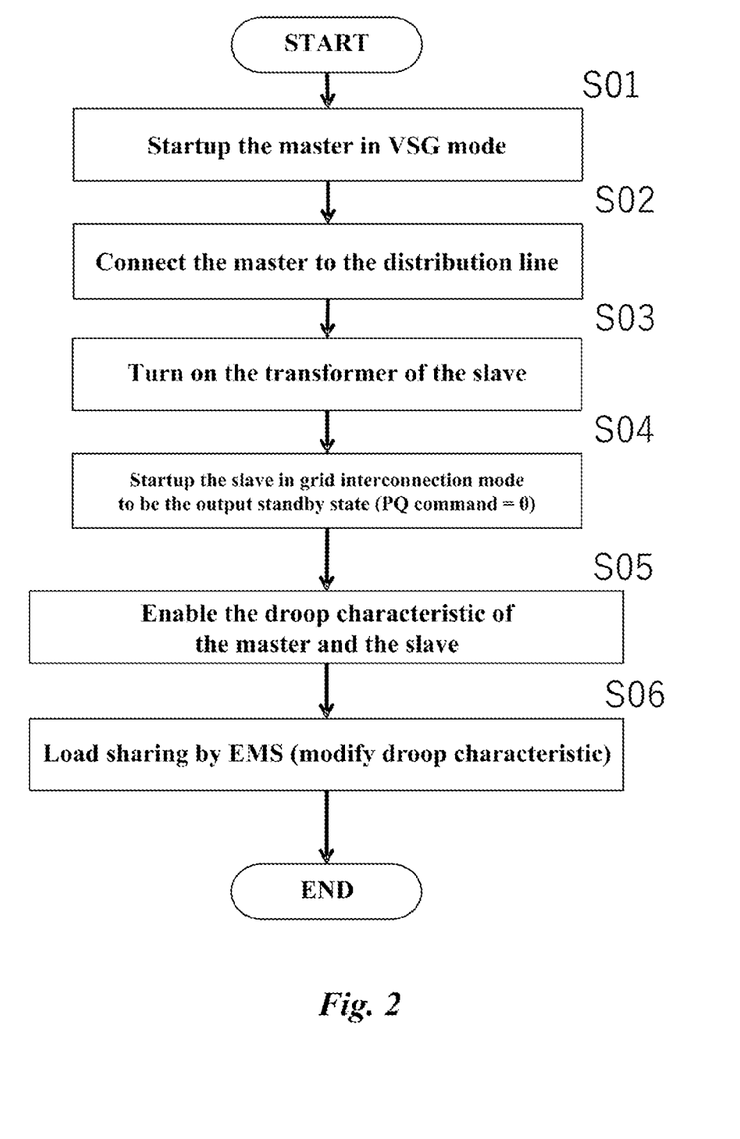
FIG. 2 is a diagram illustrating a startup sequence of the first embodiment.

A startup sequence of the microgrid startup method according to the first embodiment will be described using FIG. 2. Here, among the inverter power supplies with an independent load sharing function, the battery system 105 is called a master 105, and the battery system 106 is called a slave 106. The master 105 is an inverter power supply that is started up at first among the plurality of the inverter power supplies. The slave 106 is an inverter power supply other than the master 105, that is, the inverter power supplies that are started up secondly or later.

In the first embodiment, firstly, the master 105 is started up in the CVCF mode, and establishes grid frequency and grid voltage to supply power in the area (S01: master initial startup step). Next, the master 105 is connected to the distribution line 101 (S02). Then, a transformer of the slave 106 is turned on (S03), and the slave 106 is started up in the grid interconnection mode to be in output standby state (PQ command value=0) (S04: slave initial startup step).

When the slave 106 becomes the output standby state and the slave initial startup step S04 is finished, the CVCF mode of the master 105 and the grid interconnection mode of the slave are all changed to a droop mode at once. The master 105 and the slave 106 executes a control mode changing step to change their control modes when output fluctuation of the master 105 and the slave 106 becomes a predetermined threshold or less or when the master 105 and the slave 106 or other inverter power supplies become a predetermined operation state while output voltage of said master 105 and said slave 106 becomes a predetermined threshold or less.

Here, when the slave 106 becomes the output standby state, the slave 106 executes the control mode changing step to change its control modes. In the first embodiment, since inverter power supplies are all changed to the droop mode at once, the control mode changing step is called the control mode changing step to droop mode. Note that, although the control modes of the inverter power supplies are all changed at once in the following embodiment, the control modes may not be changed all at once, and an order to change the control modes may be arbitrary. However, when changing the control modes, it is desirable that difference between the output before the change and the output command value after the change is smaller.

In the first embodiment, in the control mode changing step to droop mode, droop characteristics of the master 105 and the slave 106 are enabled first, so that the maser 105 and the slave 106 share the load according to the droop characteristic (S05: droop characteristic enabling step). Then, active power output command value values of the master 105 and the slave 106 from the EMS 110 are updated to modify the droop characteristics of the master 105 and the slave 106, and load sharing is performed by the EMS 110 (S06: load sharing step by EMS). "Enabling the droop characteristic" in the droop characteristic enabling step S05 means enabling a portion (200, 201) surrounded by the dotted line in the control block diagram of FIG. 3 at the master-105 side, and enabling a portion (210, 211) surrounded by the dotted line in FIG. 4 at the slave-106 side.

Figure 3:
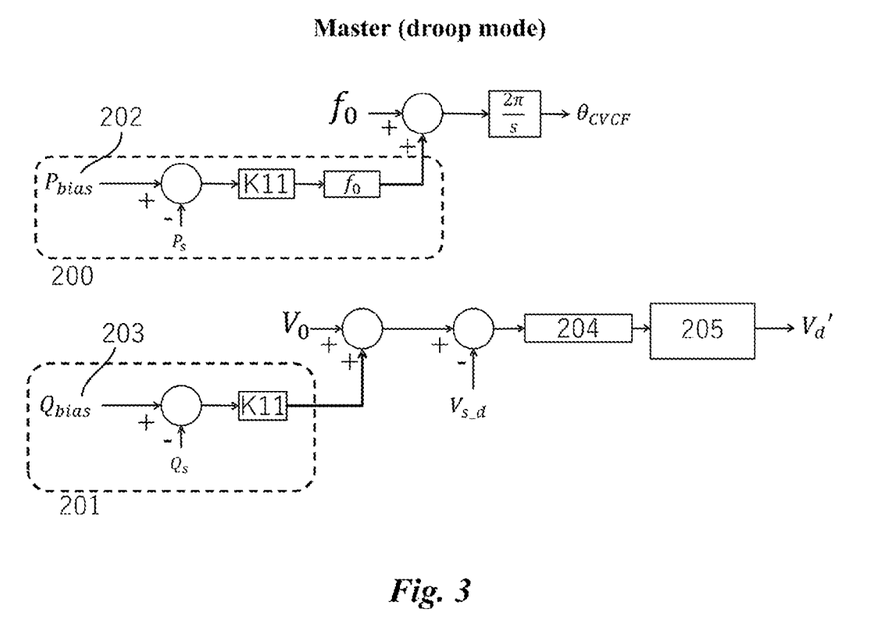
FIG. 3 is a control block diagram of droop control of a master in the first embodiment.
Figure 4:
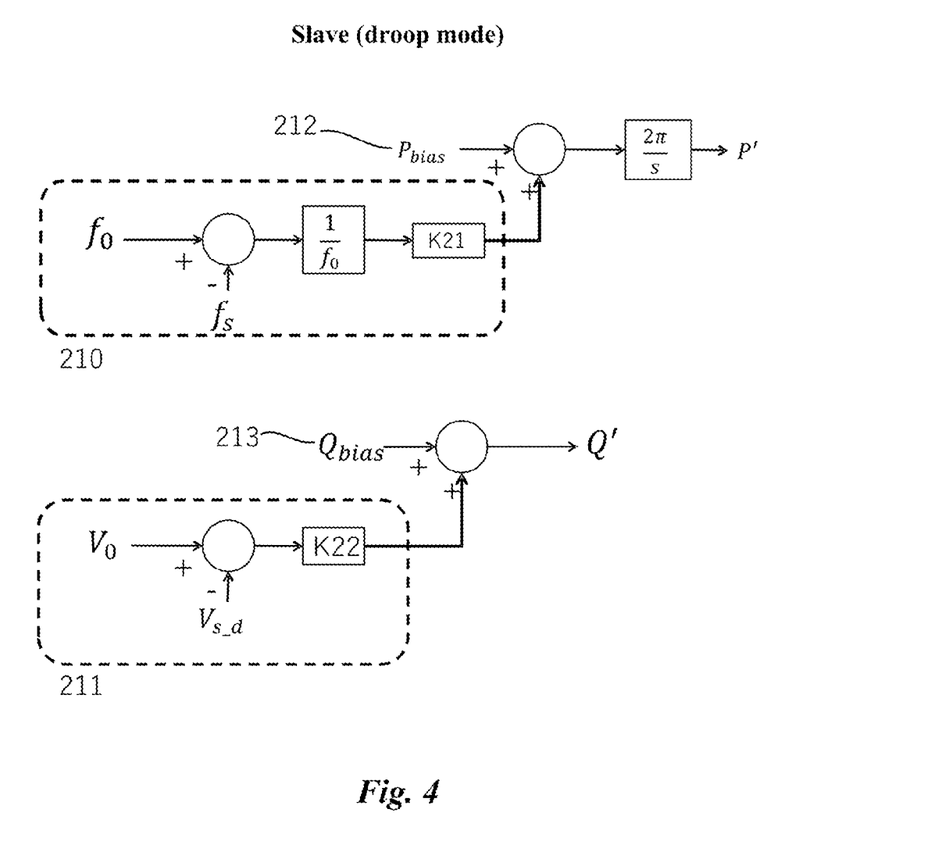
FIG. 4 is a control block diagram of droop control of a slave in the first embodiment.

FIG. 3 is a control block diagram of the droop control at the master side in the first embodiment, and FIG. 4 is a control block diagram of the droop control at the slave side in the first embodiment. The 200 in FIG. 3 has the drooping characteristic to change the frequency with respect to a change in the active power output of the inverter power supply in the droop mode of the master, and the 201 in FIG. 3 has the drooping characteristic to change the frequency with respect to a change in the reactive power output.

The 200 in FIG. 4 has the drooping characteristic in which the inverter power supply changes its active power output with respect to a change in the grid frequency in the droop mode of the slave, and the 201 in FIG. 4 has the drooping characteristic in which the inverter power supply changes its reactive power output with respect to the grid voltage. Furthermore, "updating the active power command value" in the load sharing step S06 by EMS" means modifying $P_{bias}$ 202 and $Q_{bias}$ 203 in FIG. 3 by the EMS 110 at the master-105 side, and modifying $P_{bias}$ 212 and $Q_{bias}$ 213 in FIG. 4 by the EMS 110 at the slave-106 side. Note that in FIG. 3, the 204 is a first-order lag circuit, and the 205 is an ACAVR (PI control) portion to automatically maintain voltage of a power generator constant.
(Action and Effect)

In the first embodiment, the master 105 is started up in the CVCF mode to establish the grid frequency and grid voltage in the master initial startup step, and the slave 106 is started up in the grid interconnection mode to be in the output standby state (PQ command value=0) in the slave initial startup step. Then, in the control mode changing step to droop mode that is the control mode changing step, the CVCF mode of the master 105 and the grid interconnection mode of the slave 106 are all changed to the droop mode at once. According to such first embodiment, magnetizing inrush current at the time of starting up the inverter power supply can be suppressed, and the frequency fluctuation can be suppressed. Therefore, there is no concern that transformer output current when starting up the microgrid violates the transformer protection level, and the microgrid can be stably started up.

Furthermore, in the first embodiment, the grid frequency and grid voltage can be surely established because the master 105 starts up in the CVCF mode, and the frequency and voltage can be easily maintained because the grid interconnection mode of the slave 106 finishes in the output standby state (PQ command value=0). Moreover, in the first embodiment, since the master 105 and the slave 106 switch to the droop mode at the same time, transient fluctuation does not occur in the output voltage, and the load sharing can be performed in well-balance. In addition, in the droop control step in the first embodiment, since the droop characteristic enabling step S05 is executed first, and then the load sharing step S06 by EMS is executed, there is an advantage that the load sharing can be rapidly performed.

(2) Second Embodiment

The basic configuration of the microgrid in the second and subsequent embodiments is the same as the first embodiment. Therefore, the description for the basic configuration is omitted in the second and subsequent embodiments.

In the droop control step in the above first embodiment, the droop characteristic enabling step S05 is executed first, and then the load sharing step S06 by EMS is executed. Therefore, when the droop characteristics of the master 105 and the slave 106 are enabled, the load is shared between the master 105 and the slave 106 according to the droop characteristics while the power is supplied only by the master 105. As a result, the startup of the microgrid might cause the reduction in the frequency. Accordingly, in the second embodiment, to avoid the reduction in the frequency when enabling the droop characteristic, a startup sequence illustrated in FIG. 5 is performed.

(Startup Sequence)

Figure 5:
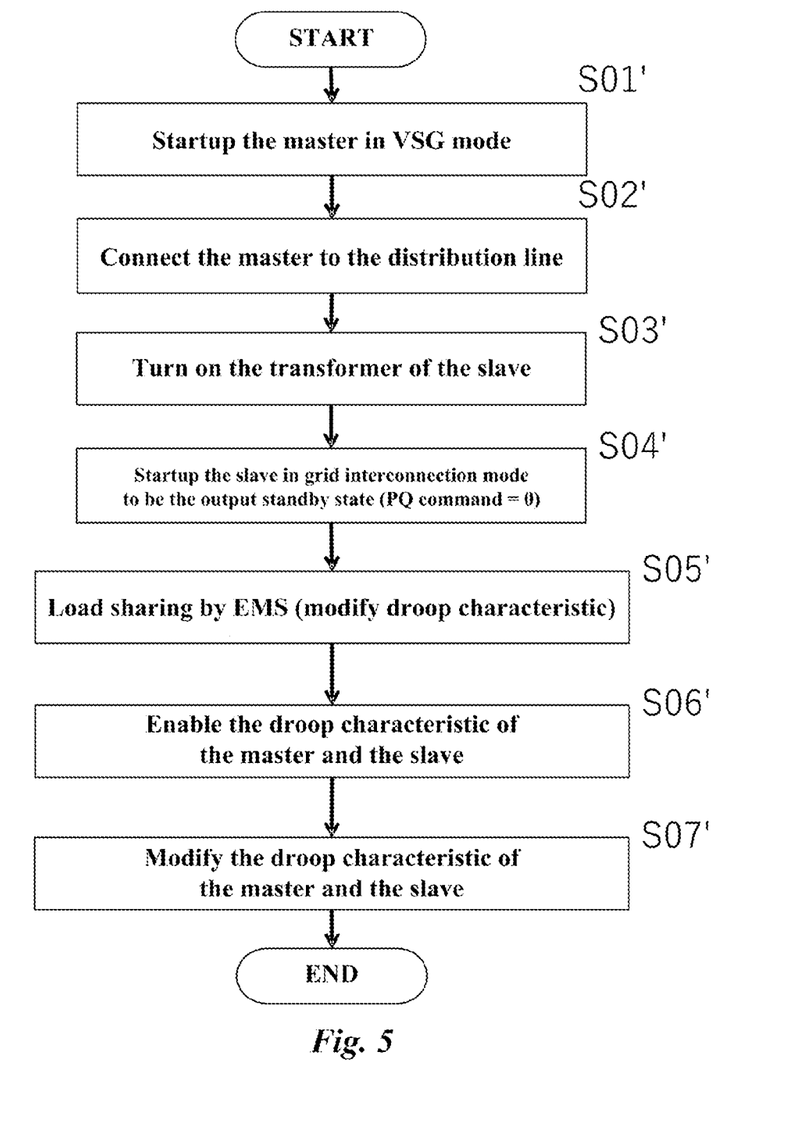
FIG. 5 is a diagram illustrating a startup sequence of the second embodiment.

As illustrated in FIG. 5, in the second embodiment, the master 105 is started up in the CVCF mode and establishes grid frequency and grid voltage (S01': master initial startup step), and then, the master 105 is connected to the distribution line (S02'). Next, a transformer of the slave 106 is turned on (S03'), and the slave 106 is started up in the grid interconnection mode to be in output standby state (PQ command value=0) (S04': slave initial startup step). This is the same as the startup sequence of the above first embodiment.

When the slave 106 becomes the output standby state and the slave initial startup step S04' is finished, the control mode changing step to droop mode is also executed in the second embodiment. However, the order of the droop characteristic enablement and the load sharing by EMS is reversed between the control mode changing steps to droop mode of the first embodiment and the second embodiment.

That is, in the control mode changing step to droop mode in the second embodiment, firstly, the load sharing by the EMS 110 is performed in advance, and then the active power command value is provided to the slave 106 (S05': load sharing step by EMS). Then, the droop characteristics of the master 105 and the slave 106 are enabled (S06': droop characteristic enabling step). Next, after the droop characteristics are enabled, bias of active and reactive power is modified by the EMS 110 to modify the droop characteristics (S07': droop characteristic modification step).

(Action and Effect)

In the second embodiment, similarly to the above first embodiment, by changing the CVCF mode of the master 105 and the grid interconnection mode of the slave 106 all at once, the magnetizing inrush current at the time of starting up the inverter power supply can be suppressed. Therefore, according to the second embodiment, the microgrid can be started up without the transformer output current at the time of starting up the microgrid violating the transformer protection level, and the microgrid can be stably started up. Furthermore, in the second embodiment, in the control mode changing step to droop mode, the master 105 and the slave 106 share the load first, and the droop characteristics are enabled. Therefore, the second embodiment can surely avoid the reduction in frequency when enabling the droop characteristics because the embodiment will not share a load between the master 105 and the slave 106 according to the droop characteristics while the power is supplied only by the master 105.

(3) Third Embodiment

In the above first and second embodiments, in the control mode changing step, the control mode changing step to droop mode of changing all control modes of the master 105 and the slave 106 in the initial startup at once is employed. In contrast, in the third embodiment, in the control mode changing step, the CVCF mode of the master 105 and the grid interconnection mode of the slave 106 are all changed to the VSG mode at once. In the third embodiment, since inverter power supplies are all changed to the VSG mode at once, the control mode changing step is called the control mode changing step to VSG mode. The VSG mode is also called a voltage-type droop mode.

(Startup Sequence)

Figure 6:
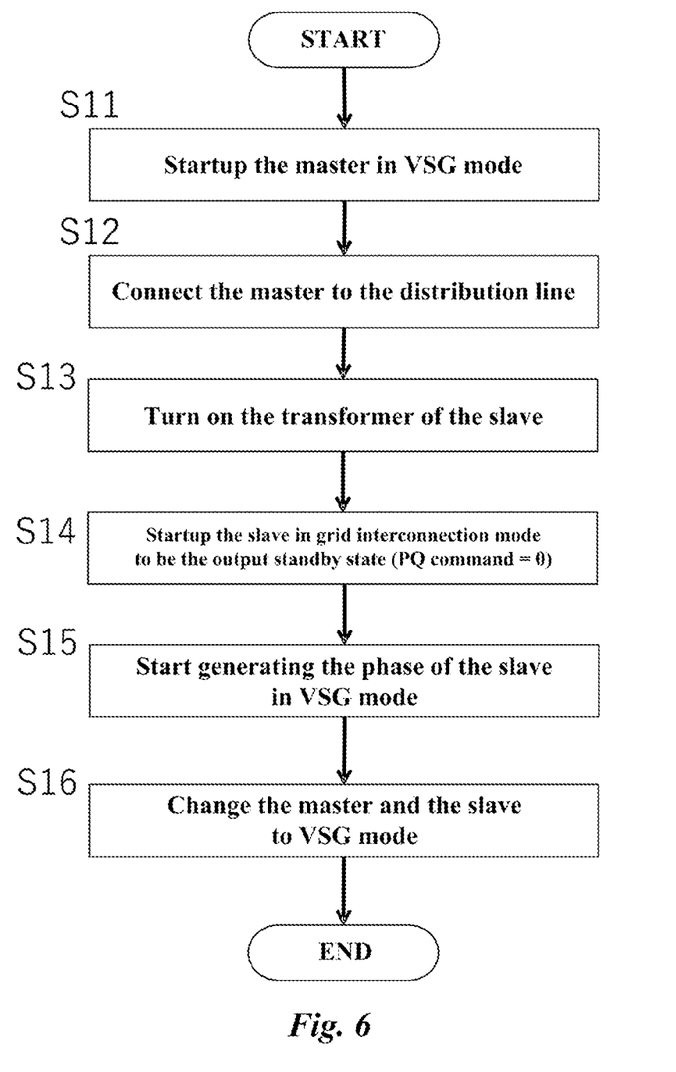
FIG. 6 is a diagram illustrating a startup sequence of the third embodiment.

A startup sequence of the third embodiment is described using FIG. 6. As illustrated in FIG. 6, in the third embodiment, firstly, the master 105 is started up in the CVCF mode, and establishes the grid frequency and the grid voltage to supply power in the area (S11: master initial startup step). Next, the master 105 is connected to the distribution line 101 (S12). Then, a transformer of the slave 106 is turned on (S13), and the slave 106 is started up in the grid interconnection mode to be in output standby state (PQ command value=0) (S14: slave initial startup step). This is the same as the startup sequence of the above first and second embodiments.

In the third embodiment, when the slave 106 becomes the output standby state and the slave initial startup step S14 is finished, phase generation starts in the slave 106 in the VSG mode (S15). In S15, a phase calculator in the VSG mode is run with no load, while controlling the output voltage V of the slave 106 by a fixed value or by AVR (Automatic Voltage Regulator). This point is described using FIG. 7.

Figure 7:
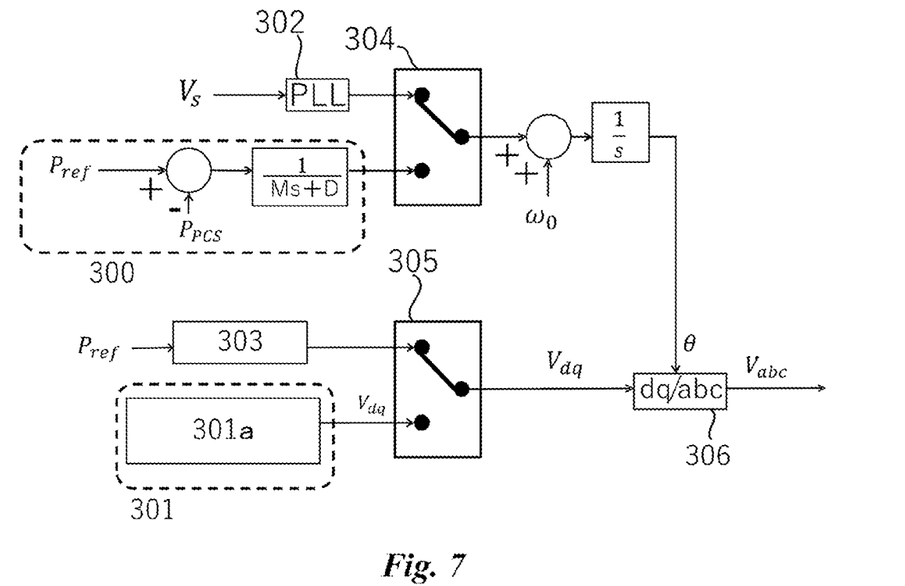
FIG. 7 is a control block diagram of connection to charged grid in a VSG mode in the third embodiment.

FIG. 7 is a control block diagram of connection to charged grid in a VSG mode in the third embodiment. Among signs illustrated in FIG. 7, 302 is a PLL (Phase Locked Loop) that is a portion acquiring frequency of the grid voltage, a portion surrounded by the dotted line 300 is a phase generation circuit simulating the mechanical characteristics of a power generator, a portion surrounded by the dotted line 301 is a voltage controller controlling voltage in VSG mode, and 301*a* indicates a fixed value or AVR. 303 is a current controller to make the active and reactive power in the grid interconnection mode to follow the command value, and 304 and 305 are control switching circuits. 306 is a circuit performing coordinate conversion based on the output phase (indicated as dq/abc). In general, in the grid interconnection mode, the grid voltage is detected by the PLL (Phase Locked Loop) to control the inverter power supply, and in the VSG mode, as illustrated in the dotted lines 300 and 301 in FIG. 7, the inverter power supply is controlled based on difference between an active power command value ($P_{ref}$) and active power output ($P_{PCS}$) of the converter.

Therefore, if the difference between the active power command value ($P_{ref}$) and the active power output ($P_{PCS}$) in the phase generation circuit 300 in FIG. 7 is large when changing the control mode of the slave 106 from the grid interconnection mode to the VSG mode in the VSG controlling step, disturbance may occur. Furthermore, sudden change in the voltage command value on the dq axis of the phase generation circuit 301 causes failure such as shut down of the phase generation circuit 301.

Accordingly, in the third embodiment, S15 in FIG. 6 is executed to start generating a phase in the VSG mode before changing the slave 106 to the VSG mode. Here, the phase generation circuit 300 is run with no load, and the command value of the output voltage $V_{dq}$ is controlled by the fixed value of the AVR in the voltage controller 301. By this, when the slave 106 is changed from the grid interconnection mode to the VSG mode, the command value from the EMS 110 matches with the active power output of the slave 106 in a certain range.

Furthermore, in the third embodiment, the slave 106 is changed from the grid interconnection mode to the VSG mode, and at the same time, the calculation method for the phase and voltage are changed. For example, in the grid interconnection mode, the phase is calculated based on the grid voltage and the power is determined based on the command value following control of the active and reactive power, and in the VSG mode, the phase is calculated based on the simulated mechanical characteristic of the generator and the voltage is determined based on the voltage control command value. In addition to the above step S15, in the third embodiment, the CVCF mode of the master 105 and the grid interconnection mode of the slave 106 are all changed to the VSG mode at once (S16: control mode changing step to VSG).
(Action and Effect)

In the third embodiment, after the master 105 is started up in the CVCF mode to establish the grid voltage in the master initial startup step and the slave 106 is started up in the grid interconnection mode in the slave initial startup step, the CVCF mode of the master 105 and the grid interconnection mode of the slave 106 are all changed to the VSG mode at once in the control mode changing step to VSG. According to such third embodiment, the magnetizing inrush current at the time of starting up the inverter power supply can be suppressed, like the first and second embodiment. Therefore, the stability when starting up the microgrid is improved.

Furthermore, in the third embodiment, since the master 105 and the slave 106 switches to the VSG mode at the same time, there is no possibility of the slave 106 started up in the VSG mode while the master 105 is operating in the VSG mode. Therefore, the transient fluctuation will not occur in the output voltage of the slave 106, and stable startup is enabled. Moreover, in the third embodiment, since the master 105 is started up in the CVCF mode and is not operated in the VSG mode at first, there is no concern that the fluctuation in the grid frequency occur until the EMS 110 determines the active power command value in view of overall system.

Furthermore, according to the third embodiment, the phase generation circuit in the VSG mode is run with no load before executing the control mode changing step S16 to the VSG mode, and the control mode of the slave 106 is changed from the grid interconnection mode to the VSG mode after controlling the command value of the output voltage $V_{dq}$ by the fixed value or the AVR. Therefore, the phase of the grid voltage and the voltage phase of the active power of the slave 106 can be easily matched before executing the VSG controlling step S16. Therefore, even when the control mode of the slave 106 becomes the VSG mode, the difference between the active power command value ($P_{ref}$) and the active power output ($P_{PCS}$) in the phase generation circuit 300 can be surely suppressed, and the disturbance can be avoided.

Furthermore, in the third embodiment, since the command value of the output voltage $V_{dq}$ is controlled by the fixed value or the AVR, sudden change in the voltage command value on the dq axis of the phase generation circuit 301 will not occur and the phase generation circuit 301 will not shut down. Therefore, when changing the slave 106 from the grid interconnection mode to the VSG mode, the divergence of the slave 106 from the grid voltage can be prevented while synchronizing with the grid phase, and the stability of the microgrid when starting up is improved.

(4) Fourth Embodiment

In the above third embodiment, when starting to generate the phase of the slave 106 in the VSG mode in S15, the divergence between the grid voltage and the voltage at the slave-106 side is avoided while synchronizing the phase of the grid voltage and the initial voltage at the slave-106 side, however, the control to achieve this, such as controlling the command value of the output voltage $V_{dq}$ by the fixed value of the AVR, is complicated.

Therefore, in the fourth embodiment, the slave 106 is started up in the VSG mode from the beginning instead of changing the slave 106 from the grid interconnection mode to the VSG mode. That is, in the fourth embodiment includes the master initial startup step of firstly starting up the master 105 in the CVCF mode, a slave startup step if starting up the slave 106 in the VSG mode from the beginning, and the control mode changing step of changing the CVCF mode of the master 105 to the VSG mode.
(Startup Sequence)

Figure 8:
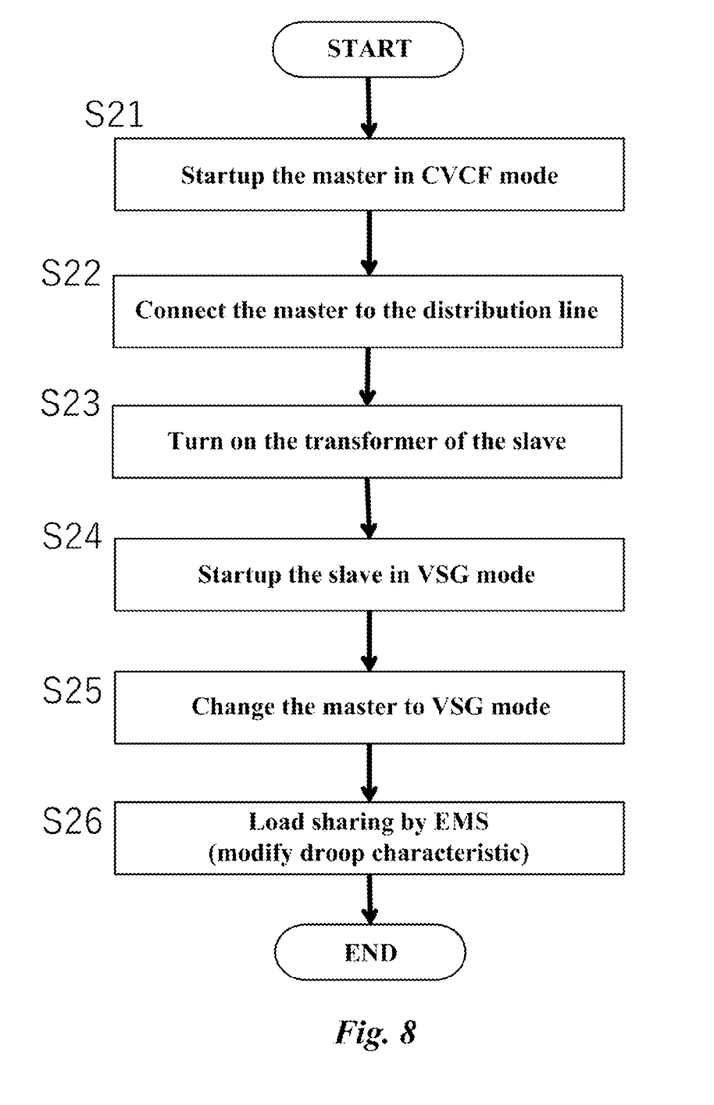
FIG. 8 is a diagram illustrating a startup sequence of the fourth embodiment.

A startup sequence of the microgrid startup method according to the fourth embodiment will be described using FIG. 8. As illustrated in FIG. 8, firstly, the master 105 is started up in the CVCF mode, and establishes the grid frequency and grid voltage to supply power in the area (S21: master initial startup step). Next, the master 105 is connected to the distribution line 101 (S22). Next, a transformer of the slave 106 is turned on (S23), and the slave 106 is started up in the VSG mode (S24: slave startup step). After starting up the slave 106 in the VSG mode, the CVCF mode of the master 105 is changed to the VSG mode (S25: control mode changing step to VSG mode), and the active power output command value values of the master 105 and the slave 106 from the EMS 110 are updated (S26).

Figure 9:
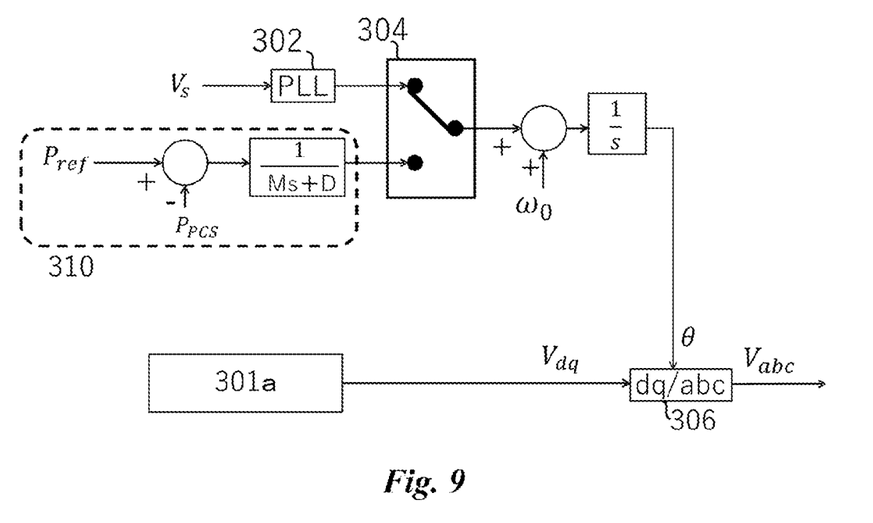
FIG. 9 is a control block diagram of connection to charged grid in a VSG mode in the fourth embodiment.

The slave 106 according to the fourth embodiment is set so that the command value from the EMS matches with the active power output of the slave 106 in certain range before the startup. This point is described using FIG. 9. FIG. 9 is a control block diagram of connection to charged grid in a VSG mode in the fourth embodiment. The signs in FIG. 9 are the same as those in FIG. 7, As illustrated in FIG. 9, the slave 106 detects the phase of the grid voltage by the PLL (Phase Locked Loop) and at the same time runs the phase calculator (portion 311 indicated by the dotted line in FIG. 9) in the VSG mode before the startup. By this, in the slave 106, the command value from the EMS matches with the active power output of the slave 106 in certain range.

(Action and Effect)

In the fourth embodiment, after the master 105 is started up in the CVCF mode to establish the grid voltage in the master initial startup step and the slave 106 is started up in the VSG mode in the slave startup step, the CVCF mode of the master 105 is changed to the VSG mode in the control mode changing step to VSG. According to such fourth embodiment, the magnetizing inrush current at the time of starting up the inverter power supply can be suppressed and the stability when starting up the microgrid is improved, like the first to third embodiments.

Furthermore, in the fourth embodiment, there is no possibility of the slave 106 started up in the VSG mode while the master 105 is operating in the VSG mode. Therefore, the transient fluctuation will not occur in the output voltage of the slave 106, and stable startup is enabled. Moreover, in the fourth embodiment, since the master 105 is started up in the CVCF mode and is not operated in the VSG mode at first, there is no concern that the fluctuation in the grid frequency occur until the EMS 110 determines the active power command value in view of overall system.

Furthermore, since the fourth embodiment is set the command value from the EMS 110 matches with the active power output of the slave 106 in certain range, there is no need to perform troublesome control associated to the mode change of the slave 106, and the phase of the grid voltage and the voltage phase of the active power of the slave can be easily matched. Therefore, by changing the phase generation circuit at the time of startup, the slave 106 can be operated using the phase by the VSG mode while the initial phase is synchronized with the phase of the grid voltage.

Therefore, the difference between the active power command value ($P_{ref}$) and the active power output ($P_{PCS}$) in the phase generation circuit 300 can be suppressed when the slave 106 starts up in the VSG, and the disturbance can be avoided. According to the fifth embodiment, by using the control switching of the PLL and the phase generation when changing the control mode of the slave 106, the fluctuation of the magnetizing inrush current and the output voltage can be suppressed, and this contributes to the stabilization of the startup of the microgrid.

(5) Fifth Embodiment

The above first to fourth embodiments startup the master 106 in the CVCF mode until the grid voltage is established in the master initial startup step, and changes the CVCF mode of the master 105 to the droop mode or the VSFG mode in the control mode changing step. In contrast, in the fifth embodiment, the control mode of the master 105 is not changed and is started up in the VSG mode from the beginning.

In the fifth embodiment includes a master startup step of starting up the master 105 in the VSG mode, a phase detection step of detecting the phase of the grid voltage, and the slave 106 startup step of starting up the slave in the VSG mode based on the phase detected in the phase detection step. That is, the fifth embodiment includes the phase detection step of detecting the phase of the grid voltage instead of the step of changing the control mode of the inverter power supply. The fifth embodiment is not limited to the startup method of the microgrid and may also be regarded as a startup program that instruct a computer to execute each step, a recording medium recording said startup program, or a startup device for the microgrid including components to execute each step.

(Startup Sequence)

Figure 10:
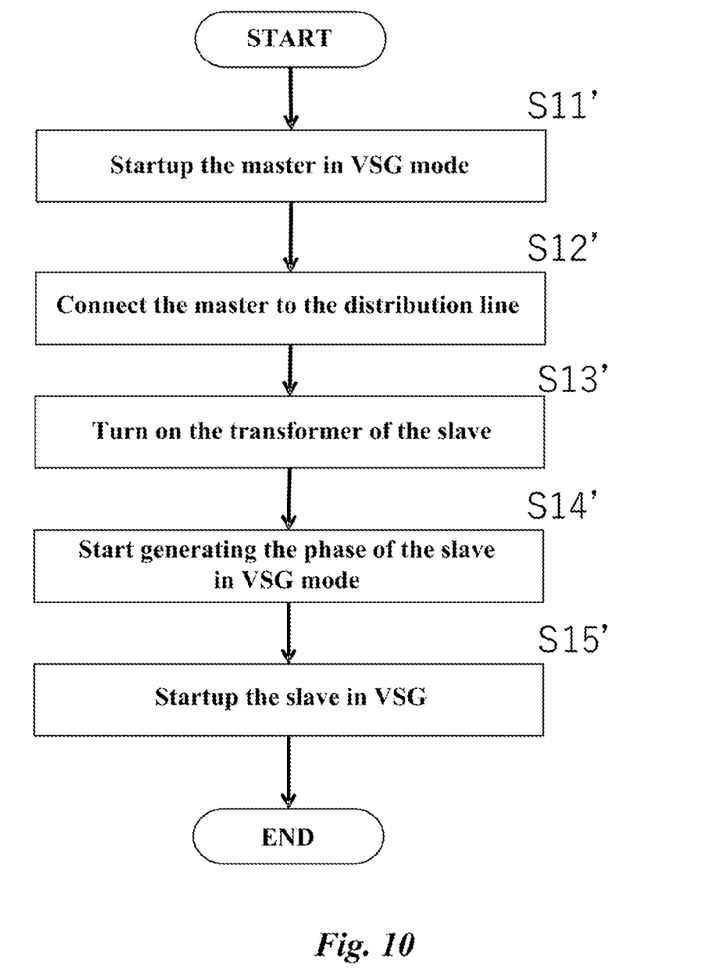
FIG. 10 is a diagram illustrating a startup sequence of the fifth embodiment.

A startup sequence of the microgrid startup method according to the first embodiment will be described using FIG. 10. As illustrated in FIG. 10, in the fifth embodiment, the master 105 is started up in the VSG mode (S11': master startup step) and is connected to the distribution line (S12'), and then the transformer of the slave 106 is turned on (S13'), and the phase generation is started in the slave 106 in the VSG mode (S14': phase detection step). Then, the slave 106 is started up in the VSG mode (S15': slave startup step).

Also in the fifth embodiment, the phase of the grid voltage and the voltage phase of the active power of the slave 106 is matched before starting up the slave 106 in the VSG mode. That is, the slave 106 according to the fifth embodiment employs the slave 106 illustrated in FIG. 9 that detects the phase of the grid voltage by the PLL (Phase Locked Loop) and at the same time runs the phase calculator (portion 310 indicated by the dotted line in FIG. 9) with no load in the VSG mode before the startup. By this, in the slave 106 according to the fifth embodiment, the command value from the EMS 110 matches with the active power output of the slave 106 in certain range.

(Action and Effect)

Like the above fourth embodiment, since the fifth embodiment is set so that the command value from the EMS 110 matches with the active power output of the slave 106 in certain range, there is no need to perform troublesome control associated to the mode change of the slave 106, and the phase of the grid voltage and the voltage phase of the active power of the slave 106 can be easily matched. Therefore, the slave 106 can be operated using the phase by the VSG mode while the initial phase is synchronized with the phase of the grid voltage by switching the phase generation circuit at the time of the startup. Therefore, the difference between the active power command value ($P_{ref}$) and the active power output ($P_{PCS}$) in the phase generation circuit 300 can be suppressed when the slave 106 starts up in the VSG mode, and the disturbance can be avoided.

Other Embodiment

Although some embodiments according to the present disclosure are described, these embodiments are only presented as examples and are not intended to limit the scope of the claims. These new embodiments can be implemented in other various forms, and various omission, replacement, modification, and change may be performed without departing from an abstract of the invention. These embodiments and modification thereof are included in the scope and abstract of the invention, and are included in the invention described in the scope of the claims.

For example, although the order of the droop characteristic enablement step and the load sharing step by EMS is reversed between the control mode changing steps to droop mode of the first embodiment and the second embodiment, when the droop characteristic enablement step comes first and the load sharing step by EMS comes later, the load can be shared earlier but the reduction in frequency occurs easier. In contrast, when the load sharing step by EMS comes first and the droop characteristic enablement step comes later, the reduction in frequency can be suppressed but the load sharing is completed slower.

Accordingly, in the control mode changing step to droop mode, the order of the droop characteristic enablement step and the load sharing step by EMS may be selected based on the fluctuation amount of the frequency or voltage allowed in the microgrid. According to such embodiments, by selecting the order of the droop characteristic enablement step and the load sharing step by EMS based on the fluctuation amount of the frequency or voltage allowed in the microgrid, the load sharing may be performed at appropriate timing and the reduction in frequency can be surely prevented.

Furthermore, there should be two or more the inverter power supplies independently sharing a load, and when there are three or more inverter power supplies, one of them is the master and the others are the slaves. When there is a plurality of the slaves, the order of starting up the slave or changing the control modes in the slave mat be predetermined and performed sequentially.

Furthermore, the voltage produced by the inverter power supply that is the slave may be controlled in accordance with the grid voltage. For example, before changing the control mode of the inverter power supply corresponding to the slave, a constraint or delay control of the rate of change with respect to the voltage command value may be performed so that the voltage command value on the dq coordinate axis is kept within a certain range. According to such embodiments, sudden change in the voltage command value on the dq coordinate axis can be prevented when changing the control mode of the inverter power supply at the slave side, and the microgrid can be stably startup. Furthermore, in the above embodiments, although the master 105 and the slave 106 execute the mode changing step to change its control modes when the slave 106 becomes the output standby state, the operation condition of the inverter power supply that causes the master 105 and the slave 106 to execute the mode changing step to change its control modes includes the output voltage of the inverter power supply and the range of the output current.

REFERENCE SIGN

101: distribution line
102: load node
103, 104: solar power generation
105, 106: storage battery system
107: area
108: switch
109: load
110: EMS

The invention claimed is:

1. A startup method of microgrid configured by a plurality of inverter power supplies independently sharing a load and divided into a master that starts up first and a slave that starts up secondly and later, the startup method comprising:
a master initial startup step of initially starting up the master in a CVCF mode;
a slave initial startup step of initially starting up the slave in a grid interconnection mode; and
a control mode changing step of the master and the slave changing control modes thereof when output fluctuation of the master and the slave becomes a predetermined threshold or less or when the master and the slave or other inverter power supplies become a predetermined operation state while output voltage of said master and said slave becomes a predetermined threshold or less.

2. The startup method of microgrid according to claim 1, wherein the control mode changing step is a control mode changing step to a droop mode of changing the CVCF mode of the master to the droop mode of the master and changing the grid interconnection mode of the slave to the droop mode of the slave, and includes a droop characteristic enablement step of enabling droop characteristics of the master and the slave and a load sharing step of updating a command value from outside the microgrid and sharing a load by external control.

3. The startup method of microgrid according to claim 2, wherein the control mode changing step to droop mode executes the droop characteristic enablement step after executing the load sharing step, and executes a droop characteristic modification step of modifying the droop characteristic.

4. The startup method of microgrid according to claim 2, wherein the control mode changing step to droop mode selects an order of the droop characteristic enablement step and the load sharing step based on fluctuation amount of frequency or voltage allowed in the microgrid.

5. The startup method of microgrid according to claim 1, wherein the control mode changing step is a control mode changing step to a VSG mode of changing the CVCF mode of the master to the VSG mode of the master and changing the grid interconnection mode of the slave to the VSG mode of the slave.

6. The startup method of microgrid according to claim 1, wherein the command value from outside the microgrid and an active power output of the slave is matched in a certain range before the slave is started up.

7. The startup method of microgrid according to claim 1, wherein voltage produced by the slave and grid voltage are matched.

8. A startup program of microgrid executed by a computer, the microgrid configured by a plurality of inverter power supplies independently sharing a load and divided into a master that starts up first and a slave that starts up secondly and later, the startup program comprising:
a master initial startup step of initially starting up the master in a CVCF mode;
a slave initial startup step of initially starting up the slave in a grid interconnection mode; and
a control mode changing step of the master and the slave changing control modes thereof when output fluctuation of the master and the slave becomes a predetermined threshold or less or when the master and the slave or other inverter power supplies become a predetermined operation state while output voltage of said master and said slave becomes a predetermined threshold or less.

9. The startup method of microgrid according to claim 3, wherein the control mode changing step to droop mode selects an order of the droop characteristic enablement step and the load sharing step based on fluctuation amount of frequency or voltage allowed in the microgrid.

10. The startup method of microgrid according to claim 6, wherein voltage produced by the slave and grid voltage are matched.

* * * * *